United States Patent [19]

Vyse

[11] Patent Number: 4,565,392
[45] Date of Patent: Jan. 21, 1986

[54] QUICK CONNECT COUPLING

[75] Inventor: Gerrard N. Vyse, Bedford, Tex.

[73] Assignee: Stratoflex, Inc., Fort Worth, Tex.

[21] Appl. No.: 629,060

[22] Filed: Jul. 9, 1984

[51] Int. Cl.⁴ .............................................. F16L 55/00
[52] U.S. Cl. ........................................ 285/23; 285/94;
   285/321; 285/DIG. 2; 403/12; 403/326;
   29/453
[58] Field of Search ................... 285/23, 305, 321, 94,
   285/DIG. 2; 403/12, 326; 24/453

[56] References Cited

U.S. PATENT DOCUMENTS

| | | | |
|---|---|---|---|
| 1,995,006 | 3/1935 | Mueller et al. | 285/321 X |
| 3,345,085 | 10/1967 | Hanes | 285/321 X |
| 3,479,068 | 11/1969 | Brittain | 285/321 |
| 3,540,760 | 11/1970 | Miller | 285/321 |
| 3,584,902 | 6/1971 | Vyse | 285/305 |
| 3,600,010 | 8/1971 | Downs et al. | 285/321 X |
| 4,063,760 | 12/1977 | Moreiras | 285/321 X |

FOREIGN PATENT DOCUMENTS

| | | | |
|---|---|---|---|
| 654535 | 11/1964 | Belgium | 285/321 |
| 637102 | 2/1962 | Canada | 285/321 |
| 1305096 | 8/1962 | France | 285/321 |

Primary Examiner—Dave W. Arola
Attorney, Agent, or Firm—Marshall, O'Toole, Gerstein, Murray & Bicknell

[57] ABSTRACT

This disclosure relates to a quick connect coupling including a tubular socket or receptacle part having an internal groove formed therein, a tubular nipple or insert part having an external groove formed thereon, and a snap ring. The nipple is insertable into the socket and when so inserted the two grooves are radially aligned. The snap ring is mounted in and extends between the two grooves to lock the socket and the nipple in assembled relation. Prior to final assembly, the snap ring is positioned in the socket groove, and in the space within the socket groove and around the snap ring is applied a relatively viscous fluid. This fluid, which may be a grease, holds the snap ring in the desired position in the groove prior to and during assembly, and it also serves as a lubricant on the ring which facilitates the assembly of the parts.

The disclosure also describes the method of assembly of the coupling.

11 Claims, 8 Drawing Figures

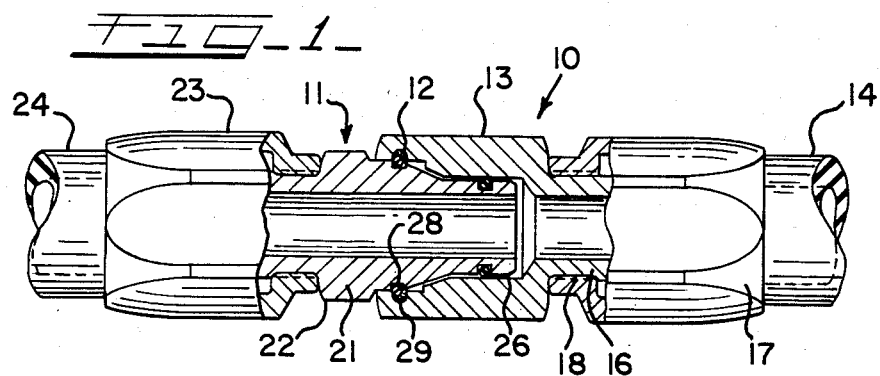
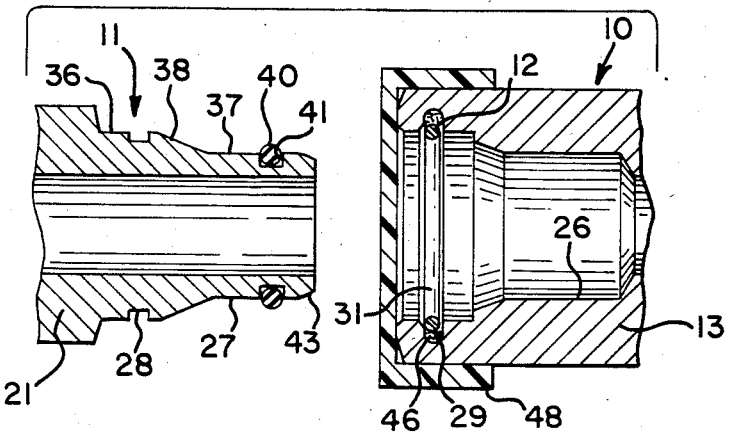
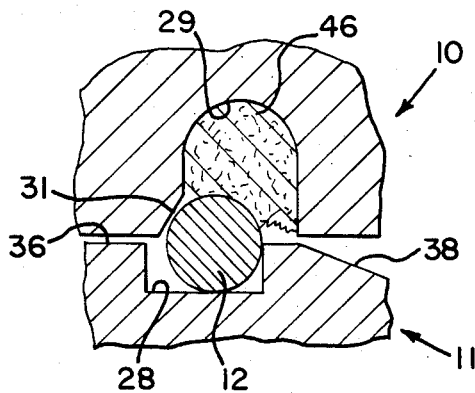
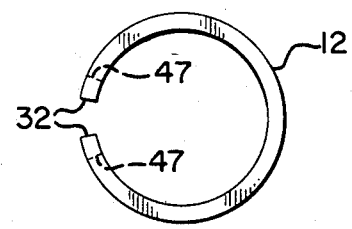

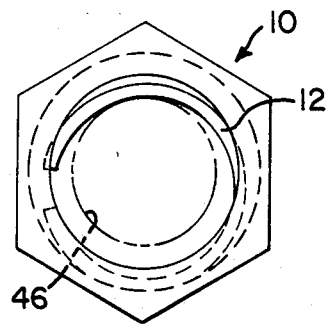
Fig_5_
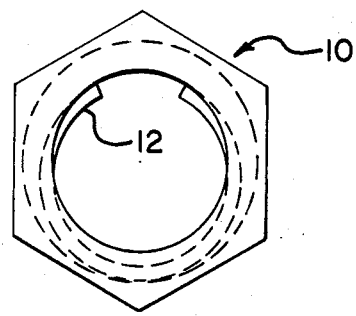
Fig_6_
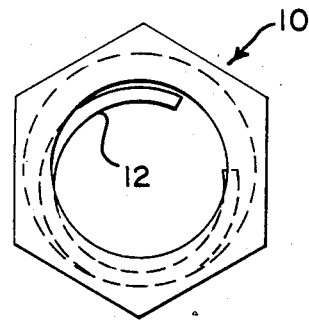
Fig_7_
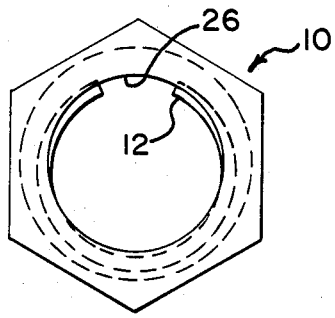
Fig_8_

QUICK CONNECT COUPLING

BACKGROUND OF THE INVENTION

Quick connect couplings or fittings are well known and various types are described in U.S. patents. For example, U.S. Pat. Nos. 4,063,760, 3,540,760 and 3,479,068 disclose couplings of this general type, which are attached to metal tubes or flexible hoses for making fluid connections. In such a coupling, a tubular nipple part is inserted into a tubular socket part, and a resilient O-ring extends between the two parts and forms a seal. Upon insertion, the two parts become locked in assembled relation by a split lock ring or snap ring which is located in radially aligned lock grooves formed in the two parts. Prior to the assembly of the two parts, the snap ring is loosely positioned in the lock groove of the outer socket. When the nipple is inserted into the socket, the forward end of the nipple passes through and expands the snap ring, and the assembly is completed when the snap ring "snaps" into the lock groove of the nipple. The snap ring then extends into both grooves, thereby locking the parts together.

Couplings of this character have been used, for example, in making hydraulic connections in automobiles and trucks, such as the connections between the engine block and an oil cooler. An automobile or truck is constructed on a moving assembly line, and workers at stations along the line make the connections while the line is moving. It is, of course, very important, because the line moves continuously, that the socket and the nipple be securely connected together very easily and rapidly.

A problem that has been encountered in making this connection is that, at the time the nipple is pushed into the socket, the forward end of the nipple sometimes jams or catches on the snap ring which is mounted in the interior opening of the socket. As mentioned, the snap ring is split so that it can be expanded during assembly, and the ends of the ring, which are cut during manufacture, are relatively sharp and often have burrs on them. The snap ring has a substantially smaller outer diameter than the maximum diameter of the groove of the socket, and consequently the snap ring may lie in the socket groove with the exposed ends of the ring in the path of the nipple during assembly. It is possible in these circumstances for the ring or the nipple or the socket to be damaged, or for extra time to be required to assemble the parts properly.

U.S. Pat. No. 4,063,760 offers a solution to the foregoing problem, which consists of forming the snap ring with straight end portions. According to this patent, the straight end portions maintain the snap ring in the proper position to receive the end of the internal part. This solution, however, has the disadvantages that the manufacture of the snap ring is made more complicated, and that a ring with straight end portions is more difficult to install in the groove of the socket.

SUMMARY OF THE INVENTION

It is a primary object of this invention to provide an improved coupling of the foregoing general character, which is economical to manufacture and readily assembled.

A coupling in accordance with this invention comprises a tubular socket having an internal groove formed therein, a tubular nipple part having an external groove formed thereon, and a snap ring. The nipple is insertable into the socket and when so inserted the two grooves are radially aligned. The snap ring is mounted in and extends between the two grooves to lock the socket and the nipple in assembled relation. Prior to final assembly, the snap ring is positioned in the socket groove, and in the space within the socket groove and around the snap ring is applied a relatively viscous fluid. This fluid, which may be a grease, holds the snap ring in the desired position in the groove prior to and during assembly, and it also serves as a lubricant on the ring which facilitates the assembly of the parts.

The invention also comprises the method of assembly of the coupling as described.

BRIEF DESCRIPTION OF THE DRAWINGS

The invention will be better understood from the following detailed description taken in conjunction with the accompanying drawing, wherein:

FIG. 1 is a view partially in section showing an assembled coupling in accordance with the present invention;

FIG. 2 is a fragmentary sectional view showing the parts prior to assembly of the coupling;

FIG. 3 is an enlarged fragmentary view of a portion of the structure shown in FIG. 1;

FIG. 5 is an end view of a socket and ring of the coupling;

FIG. 4 is a view of a ring of the coupling; and

FIGS. 6–8 are views similar to FIG. 5 but showing different positions of the parts.

DETAILED DESCRIPTION OF THE DRAWINGS

With reference to FIGS. 1 and 2, the coupling includes an external receptacle or socket 10, an internal insert or nipple 11, and a snap or lock ring 12. The socket 10 includes a main body part 13 that has a tubular configuration and may have a hexagonal outer configuration so that it may be readily gripped by a wrench. The right-hand end, as seen in FIGS. 1 and 2, of the socket 10 may be configured to be attached to various devices such as a metal housing, a metal tube, or a hose, for example. In the present illustration, the socket 10 is attached to a flexible hose 14. The right-hand end of the socket 10 has a tubular nipple 16 machined thereon, and a socket 17 is fastened to the nipple 16 as by a threaded connection indicated by the numeral 18. The hose 14 is tightly gripped between the nipple 16 and the socket 17 in a well known fashion.

The nipple 11 includes a tubular body part 21 that has a hexagonal section 22 formed thereon so that it may be gripped by a wrench. The left-hand end, as seen in FIGS. 1 and 2 may also be configured to be attached to various devices such as a housing, a tube or a hose, and in the present illustration a fitting 23 is formed on the left-hand end of the nipple 11 for attaching the nipple 11 to a flexible hose 24. The fitting 23 may be a conventional fitting similar to the socket 17 and the nipple 16 shown in FIG. 1.

The socket 10 has an internal stepped bore indicated by the numeral 26 and the nipple 11 has an external stepped outer surface indicated by the numeral 27. With reference to FIGS. 1, 2 and 3, an outer ring groove 28 is formed in the outer surface of the nipple 11 and an inner ring groove 29 is formed in the bore 26 of the socket 10. As shown in FIGS. 1 and 3, when the socket and the nipple are fully assembled, the two grooves 28 and 29 are generally in radial alignment. The ring 12 is positioned in the two grooves 28 and 29 when the parts are assembled and approximately one-half the radial width of the ring 12 extends into each of the grooves 28 and 29.

With specific reference to FIG. 3, the inner nipple groove 28 has a substantially square or rectangular cross section as shown, whereas the outer socket groove 28 preferably has a curved radially enlarged bottom part. The outer groove 29 has the radially enlarged dimension for the purpose to be described hereinafter. One corner, indicated by the numeral 31 of the outer groove 29 preferably has a slanted configuration which is advantageous in that it helps to maintain the parts in assembled relation during use. During use of the coupling, internal pressure within the bores of the socket and the nipple tends to separate the nipple from the socket. This action tends to move the socket 10 toward the right, as seen in FIGS. 1-3, relative to the nipple 11 and the slanted surface 31 wedges the ring 12 into the bottom of the inner groove 28 and thereby locks the parts tightly together.

As shown in the drawings, particularly FIG. 4, the ring 12 is split and it has an internal diameter that is substantially equal to the diameter of the bottom of the inner groove 28, when the ring 12 is in its natural or unflexed state. The ring 12 is preferably made of a stainless steel spring material and the spring tension urges the ring 12 to the bottom of the groove 28 after the parts are assembled. It will also be noted from FIG. 3 that the external diameter of the ring 12 is substantially less than the maximum diameter of the outer groove 29, and the purpose of this is to provide space in the outer groove 29 for the ring 12 to expand as the parts are being assembled. The split of the ring 12 forms a gap between the ends 32 of the ring and the gap may be formed by cutting away a section of the ring. Such a cutting action normally forms sharp edges or burrs on the ends 32, which may cause a problem as previously mentioned.

Prior to assembly of the nipple 11 with the socket 10, the ring 12 is positioned in the outer groove 29 of the socket, and in prior art couplings of this nature, the ring 12 fits loosely in the groove 29.

The stepped outer surface 27 of the nipple 11 includes an enlarged cylindrical part 36 wherein the groove 28 is formed, a reduced cylindrical part 37 at the right-hand or forward end of the nipple, and a ramped or slanted surface 38 between the surfaces 36 and 37. The location of the external surface 37 as the nipple 11 is being inserted into the socket 10 is indicated by the dash-dot lines 40 in FIG. 5, and it will be noted that the diameter of the surface 37 is less than the internal diameter of the ring 12. As the nipple 11 is assembled with the socket 10 and the ring 12, the forward end of the nipple is moved toward the right as seen in FIGS. 1 and 2 and the forward end surface extends through the ring 12. The diameter of the enlarged surface 36 is greater than the diameter of the ring 12 when in its normal or unflexed state, and consequently the ramp 38 engages the ring 12. As the nipple is pressed into the socket, the ramp 38 expands the ring 12 into the outer part of the groove 29 and the ring rides on the outer or enlarged surface 36 until the ring falls or snaps into the inner groove 28. The socket and the nipple are then of course fully and permanently assembled.

The configuration of the bore 26 of the socket generally conforms to the outer surface 27 of the nipple 11. To seal the connection between the socket and the nipple, a seal groove 41 is formed in the outer surface 37 adjacent the forward end of the nipple, and an O-ring 42 is mounted in the groove 41. As shown in FIG. 1, the O-ring 42 engages the bore 26 of the socket 10 and forms a seal between these parts.

As best shown in FIG. 2, the outer corner of the nipple 11, at the right-hand end, is preferably slanted or beveled as indicated at 43 to facilitate insertion of the nipple into the socket 10.

As previously mentioned and as shown in FIGS. 1-3, the maximum diameter of the groove 29 is substantially greater than the outer diameter of the ring in order to provide space for the ring 12 to expand during the assembly of the parts. In prior art couplings of this nature, prior to assembly the ring 12 is loosely positioned in the groove 29 and due to gravity forces the ring is normally offset to one side of the groove, as shown by the various positions of the ring shown in FIGS. 5-7. Since the ring 12 is only slightly larger than the diameter 40 of the forward end surface 27 of the nipple, a problem has been encountered in prior art constructions in that the forward end of the nipple too frequently engages the side of the ring 12 during assembly, and the ring has frequently formed an obstruction which prevents the nipple from being assembled with the socket. This problem has been aggravated in instances where the ends 32 of the ring have been exposed within the bore 26 of the socket, as shown in FIGS. 6 and 7, because the sharp ends and/or the burrs on the ends of the ring have tended to catch on the forward end of the nipple. The result has often been that the ring and/or the nipple have been damaged when excessive force is applied to push the nipple into the socket even though the ring has caught on the nipple. Even in instances where the parts have not been permanently damaged, it has frequently been the case that extra time has been required to change the position of the ring to enable the nipple to be inserted.

The foregoing problems are avoided in accordance with the present invention by the provision of a relatively viscous fluid 46 which is placed in the outer groove 29 and around the ring 12, as shown in FIGS. 2 and 3. The fluid 46 may be applied during manufacture of the coupling by placing a bit of the fluid on a worker's finger and wiping the fluid into the groove 29, preferably after the ring 12 has been installed. The viscous fluid holds the ring 12 in the desired position prior to assembly of the socket and the nipple, the ring being relatively centered in the groove 29 as shown in FIG. 8 and thus out of the path of the forward end of the nipple during assembly.

While various viscous fluids may be used for this purpose, it is preferred that a grease such as the white grease sold under the trademark Lubriplate be used because it maintains its viscous qualities even if the coupling is in a heated environment. If another viscous fluid, such as petroleum jelly, for example, were used, and if the coupling were in a relatively heated environment, such as a hot assembly factory or transportation truck, the petroleum jelly may become too liquid to hold the ring 12 in the desired position. While the groove 29 may be entirely filled with the grease, it should be understood that this is not necessary. The ring has a relatively small mass, and therefore the grease is able to hold the ring in place at normal temperatures even though the socket is jarred.

The grease serves the additional function of lubricating the ring and thus facilitating the assembly of the parts. As the operator wipes the grease into the groove 29, the internal surface of the ring receives a film of the grease, which helps the ring 12 to slide up the ramp 38. The use of a lubricant has been known in the prior art for this latter function and also a lubricant on the O-ring 40 to prevent it from tearing during assembly, but a viscous grease in the groove 29 has not been known.

The use of a grease, such as Lubriplate, is also advantageous when the coupling is used to form connections in the lubricant or oil system of an engine, because the grease is compatible with and may mix with the oil without detriment to the oil. It should be understood, however, that the O-ring 42 normally separates the grease in the groove 29 from the internal fluid medium.

A coupling as disclosed herein is manufactured and assembled by first mechanically forming or machining the socket and nipple parts, inserting the ring 12 into the groove 29 of the socket, and then wiping the grease into the groove and around the ring 12. It is preferred that, at the same time, the operator locate the ring at the position where the cut ends 32 of the ring are substantially close to the internal surface of the bore 26 of the socket, as illustrated in FIGS. 2 and 8. This action serves both to generally center the ring and to move the sharp ends of the ring out of the path of the nipple. A plastic cap 48 (FIG. 2) is preferably fastened on the end of the socket 10 to keep dirt out of the grease.

As indicated in FIG. 4, the ring 12 may have a relatively short gap where the ends are shown by the solid lines, or the ring may have a larger gap where the ends are shown by the dashed lines 47. FIG. 5 shows the short gap whereas FIGS. 6–8 show the larger gap. The larger gap of the ring 12 is preferable because it further facilitates the insertion of the nipple through the ring. As specific examples, the relatively short gap extends over an angle of approximately 20° whereas the larger, preferred gap has an angle of approximately 47°.

It should be understood that the socket and the nipple of the coupling do not have to be machined parts, as shown in FIGS. 1 and 2. They may take other forms, such as mechanically formed tubular parts as shown in G. N. Vyse U.S. Pat. No. 3,584,902.

A coupling as described and claimed herein has important advantages over prior art couplings. The socket and the nipple may be quickly and easily assembled, which is very important when they are used on assembly lines. In some assembly line connections, the worker cannot easily view the parts during assembly, and when making such "blind" connections, it is especially important that the parts be easily assembled. The grease that holds the snap ring in place prior to assembly also serves to lubricate the snap ring in order to facilitate assembly. The concept of providing grease in the snap ring groove to hold the ring in place may, of course, also be used in various types of quick-connect couplings or fittings. For example, it could be used in the type of coupling shown in the Miller U.S. Pat. No. 3,540,760 wherein provision is made for disassembling the coupling.

What is claimed is:

1. A quick connect coupling comprising:
    (a) an outer receptacle means having an internal opening and an annular outer groove formed in the inner surface of said opening;
    (b) an inner insert means having an annular inner groove formed in the outer surface thereof;
    (c) said receptacle means being adapted to be assembled with said insert means in a position where said insert means is in said opening and said inner and outer grooves are substantially radially aligned,
    (d) a split ring positioned in said outer groove prior to said assembly and extending between said inner and outer grooves after said assembly; and
    (e) a fluid at least partially filling said outer groove behind and around said ring, said fluid being sufficiently viscous to substantially hold said ring against movement in said outer groove prior to said assembly.

2. A coupling according to claim 1, wherein said fluid is a grease.

3. A coupling according to claim 1, wherein said coupling is adapted to be connected to carry a flow medium, and said fluid is compatible with said medium.

4. A coupling according to claim 3, wherein said medium is lubricating oil and said viscous fluid is a grease.

5. A coupling according to claim 1, wherein said ring has a gap formed therein and said gap extends over an angle of substantially 47° when said ring is in its free unflexed state.

6. A coupling according to claim 1, wherein said ring has a gap therein, and prior to said assembly said gap is positioned closely adjacent said inner surface.

7. A coupling according to claim 1, wherein prior to said assembly said gap is substantially centered in said opening.

8. A method of constructing a quick connect coupling, comprising:
    (a) providing an outer receptacle having an internal opening and an annular outer groove formed in the inner surface of said opening;
    (b) providing an inner insert having an annular inner groove formed in the outer surface thereof;
    (c) positioning a split ring in said outer groove; and
    (d) at least partially filling said outer groove with a fluid around said ring, said fluid being sufficiently viscous to substantially hold said ring against movement in said outer groove.

9. A method according to claim 8, and further including the step of substantially centering the ring in the internal opening.

10. A method according to claim 8, wherein said ring is made expandable by forming a gap therein, and said ring is positioned in said outer groove by positioning said gap adjacent said inner surface of said opening.

11. A method according to claim 8, and further including the step of moving said insert into said opening to cause said ring to move into said inner and outer grooves.

* * * * *